(12) United States Patent
Izumiya et al.

(10) Patent No.: US 12,108,006 B2
(45) Date of Patent: Oct. 1, 2024

(54) CONTROL DEVICE AND IMAGE FORMING SYSTEM, AND COMPUTER READABLE RECORDING MEDIUM STORING CONTROL PROGRAM

(71) Applicant: KONICA MINOLTA, INC., Tokyo (JP)

(72) Inventors: Kenji Izumiya, Hachioji (JP); Tatsuo Ishizuka, Kawasaki (JP); Hiroshi Oyama, Hino (JP); Takumi Shirakuma, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/231,205

(22) Filed: Aug. 7, 2023

(65) Prior Publication Data

US 2024/0089391 A1 Mar. 14, 2024

(30) Foreign Application Priority Data

Sep. 13, 2022 (JP) .................. 2022-145057

(51) Int. Cl.
*H04N 1/23* (2006.01)
*G06K 15/00* (2006.01)
(Continued)

(52) U.S. Cl.
CPC ........... *H04N 1/2323* (2013.01); *G06K 15/12* (2013.01); *G06K 15/4065* (2013.01); *H04N 1/00806* (2013.01)

(58) Field of Classification Search
CPC ............. H04N 1/2323; H04N 1/00806; H04N 1/00724; H04N 1/4076; H04N 1/00726; H04N 1/00734; H04N 1/00732; H04N 1/00763; H04N 1/00771; H04N 1/00774; H04N 1/00779; H04N 1/047; H04N 1/40; H04N 1/40062; H04N 1/6027; H04N 1/6044; H04N 1/6052; H04N 1/6077; H04N 1/6091; H04N 1/6097; H04N 2201/0082; H04N 1/0035; H04N 1/00519; H04N 1/00681; H04N 1/00689; H04N 1/00716; H04N 1/00737; G06K 15/12; G06K 15/4065; G03G 15/5062; G03G 15/55; G03G 15/5029; G03G 2215/00738;
(Continued)

(56) References Cited

U.S. PATENT DOCUMENTS 6,459,444 B1 * 10/2002 Matsumoto ............. B41J 2/465
347/241
7,652,709 B2 * 1/2010 Kanda ................ H04N 1/00209
348/231.2
(Continued)

FOREIGN PATENT DOCUMENTS

JP 2020126116 A 8/2020

*Primary Examiner* — Negussie Worku
(74) *Attorney, Agent, or Firm* — Holtz, Holtz & Volek PC

(57) ABSTRACT

A control device includes a controller that determines, based on physical property information corresponding to physical property of a recording sheet and read information on an image evaluated as abnormal through reading of an image on the recording sheet by a reading section on a recording sheet conveyance path, a process condition under which an image forming section performs image forming on the recording sheet.

32 Claims, 13 Drawing Sheets

(51) Int. Cl.
  *G06K 15/12* (2006.01)
  *H04N 1/00* (2006.01)
(58) Field of Classification Search
  CPC ..... G03G 2215/00751; G03G 15/0266; G03G 15/043; G03G 15/065; G03G 15/0855; G03G 15/0863; G03G 15/0865; G03G 15/2028; G03G 2215/00742; G03G 2215/00949; G03G 2215/0697; G03G 2215/2045; G03G 15/50; G03G 15/5037; G03G 15/553; G03G 15/75; G03G 21/0094; G03G 2215/00763; G03G 15/5016; G03G 15/502; G03G 15/657; G03G 15/6573; G03G 15/6591; G03G 15/6594; G03G 21/203; G03G 2215/00616; G03G 2215/00637; G06F 18/24; B41J 2/04515; B41J 2/04541; B41J 2/04543; B41J 2/04553; B41J 2/04563; B41J 2/04565; B41J 2/04566; B41J 2/04571; B41J 2/0458; B41J 2/14024; B41J 2/14048; B41J 2/14153; B41J 2/1601; B41J 2/1604; B41J 2/1623; B41J 2/1626; B41J 2/1631; B41J 2/1632; B41J 2/1635; B41J 2/1642; B41J 2/16526; B41J 2/16532; B41J 2002/14354; B41J 2002/16573; B41J 2202/13; B41J 11/005; B41J 11/08; B41J 13/10; G06N 20/00; G06N 3/02; G06N 3/084; G06N 3/088; G06N 5/046; G06T 2207/20081; G06T 2207/20084; G06T 2207/10024; G06T 2207/10061; G06T 2207/10081; G06T 2207/10088; G06T 2207/30024; G06T 2207/30168; G06T 7/0014; G06T 7/11; G06V 10/30; G06V 10/40; G06V 10/764; G06V 10/82
  USPC ........................................................ 358/1.15
  See application file for complete search history.

(56) References Cited

U.S. PATENT DOCUMENTS

| | | | |
|---|---|---|---|
| 11,922,612 B2* | 3/2024 | Tsukamoto | H04N 1/00029 |
| 2007/0297816 A1* | 12/2007 | Teshima | G03G 15/50 |
| | | | 399/16 |
| 2009/0232528 A1* | 9/2009 | Togami | G03G 15/5029 |
| | | | 399/45 |
| 2009/0244623 A1* | 10/2009 | Kurohata | G06K 15/02 |
| | | | 358/1.16 |
| 2009/0324259 A1* | 12/2009 | Ue | G03G 15/5079 |
| | | | 399/9 |
| 2016/0266535 A1* | 9/2016 | Nonaka | G03G 15/50 |
| 2019/0227468 A1* | 7/2019 | Sakamaki | G03G 15/2053 |
| 2020/0065036 A1* | 2/2020 | Ueda | G03G 15/55 |
| 2022/0179347 A1* | 6/2022 | Maruyama | G03G 15/5016 |
| 2022/0210284 A1* | 6/2022 | Tanaka | H04N 1/00732 |
| 2023/0393513 A1* | 12/2023 | Kashiwagura | G03G 15/5062 |

* cited by examiner

FIG. 5

| DEVICE ID | Job-ID | DATE AND TIME | PHYSICAL PROPERTY INFORMATION a | | | | PAPER TYPE | IMAGE QUALITY INFORMATION b: IMAGE QUALITY LEVEL | | | | PROCESS CONDITION c | | |
|---|---|---|---|---|---|---|---|---|---|---|---|---|---|---|
| | | | SMOOTHNESS | SHEET THICKNESS (μm) | MOISTURE PERCENTAGE (%) | PHYSICAL PROPERTY x | | EVALUATION | DENSITY ABNORMALITY (POOR TRANSFER) | WHITE VOID (WHITE SPOT) | IMAGE SCATTERING | CONDITION 1 (TRANSFER CURRENT) | CONDITION 2 | CONDITION 3 |
| i-01 | J-1 | 2022/x/xx | 0.8814 | 45 | 90.6 | ** | CoatedG | NORMAL | 5 (OK) | 5 (OK) | 5 (OK) | -135 | ** | ** |
| i-01 | J-2 | 2022/x/xx | 0.9067 | 135 | 87.9 | ** | CoatedG | ABNORMAL | 3.8 (NG) | 5 (OK) | 5 (OK) | -135 | ** | ** |
| i-01 | J-3 | 2022/x/xx | 0.9076 | 340 | 83.7 | ** | CoatedG | ABNORMAL | 2.5 (NG) | 5 (OK) | 5 (OK) | -130 | ** | ** |
| i-01 | J-4 | 2022/x/xx | 0.8492 | 70 | 91.4 | ** | CoatedM | NORMAL | 5 (OK) | 5 (OK) | 5 (OK) | -120 | ** | ** |
| i-01 | J-5 | 2022/x/xx | 0.6664 | 210 | 87.1 | ** | CoatedM | NORMAL | 4.5 (OK) | 5 (OK) | 5 (OK) | -140 | ** | ** |
| i-01 | J-6 | 2022/x/xx | 0.8684 | 305 | 84.5 | ** | CoatedM | ABNORMAL | 3 (NG) | 5 (OK) | 5 (OK) | -120 | ** | ** |
| i-01 | J-7 | 2022/x/xx | 0.7431 | 60 | 93.6 | ** | PLAIN | ABNORMAL | 3.8 (NG) | 5 (OK) | 5 (OK) | -175 | ** | ** |
| i-01 | J-8 | 2022/x/xx | 0.7086 | 160 | 88.7 | ** | PLAIN | ABNORMAL | 3.8 (NG) | 5 (OK) | 5 (OK) | -160 | ** | ** |
| i-01 | J-9 | 2022/x/xx | 0.7518 | 320 | 84.8 | ** | PLAIN | ABNORMAL | 5 (OK) | 4 (NG) | 5 (OK) | -300 | ** | ** |
| .. | .. | .. | .. | .. | .. | .. | .. | .. | .. | .. | .. | .. | .. | .. |
| .. | .. | .. | .. | .. | .. | .. | .. | .. | .. | .. | .. | .. | .. | .. |

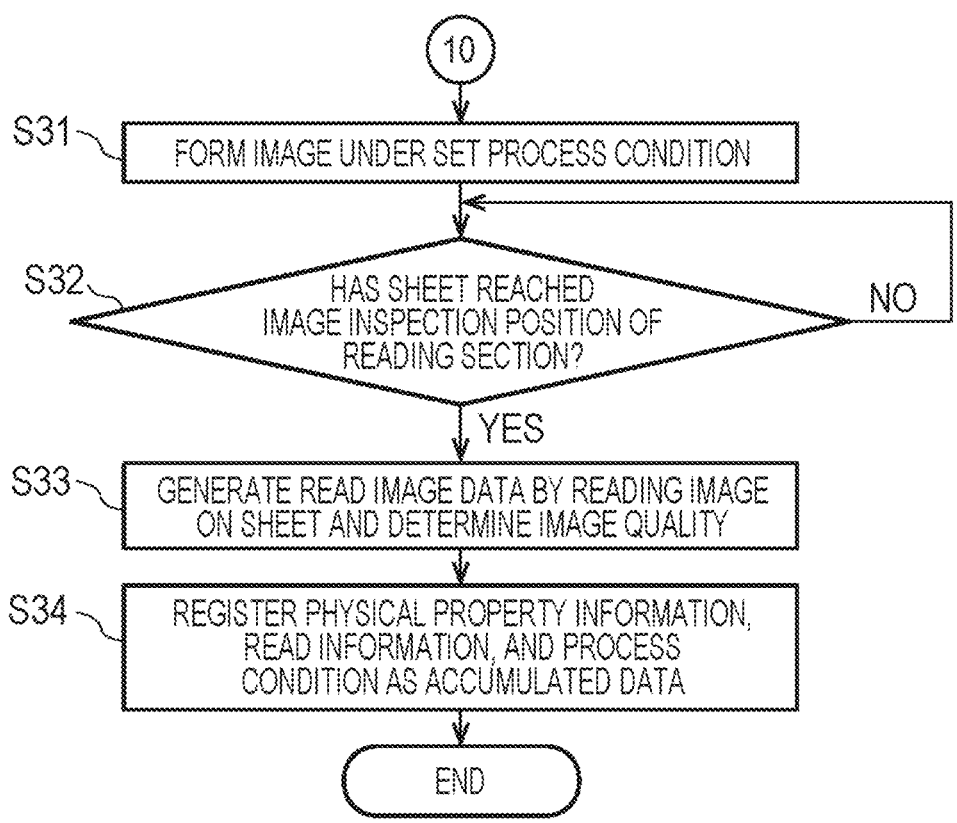

CONTROL DEVICE AND IMAGE FORMING SYSTEM, AND COMPUTER READABLE RECORDING MEDIUM STORING CONTROL PROGRAM

CROSS-REFERENCE TO RELATED APPLICATION

The entire disclosure of Japanese patent application No. 2022-145057, filed on Sep. 13, 2022, is incorporated herein by reference in its entirety.

BACKGROUND

1. Technological Field

The present invention relates to a control device, an image forming system, and a computer readable recording medium storing a control program.

2. Description of the Related Art

In recent years, an image forming apparatus such as an electrophotographic printer has been widely used in the color printing industry. In the field of production printing (PP) corresponding to the color printing industry, there is a demand for adaptation to various types of papers as compared with the case of being used in an office.

Typically, a paper type and a basis weight corresponding to a sheet to be used are input on a setting screen of an operation panel included in a device itself or a setting screen of a printer driver, and a process condition is determined based on the input setting values to perform image forming under the determined process condition.

In the image forming apparatus disclosed in Patent Literature 1 (JP 2020-126116 A), a reading device is arranged on a conveyance path downstream with respect to an image forming section. Then, an image noise and a transfer failure are determined from a read image acquired by reading the image on the sheet, and only when its image quality is determined normal in which these image quality abnormalities do not occur, the characteristics of the sheet and the process condition relating to transfer at that time are stored in a database (DB). Thereafter, when performing image forming using the sheet having a similar sheet physical property value, the transfer nip pressure is adjusted by applying the process condition in a case where the image quality is determined normal that is retrieved from the DB.

SUMMARY

The image forming apparatus according to Patent Literature 1 accumulates data related to the process condition (transfer nip pressure) only in a case where the image quality is determined normal. Thus, data to be stored in the DB is limited although there are various sheets having various sheet physical properties. Consequently, it is not easy to increase data, so that the range of sheets for which the process condition is efficiently obtained becomes narrow. In addition, it is difficult to efficiently acquire the process condition for the corresponding sheet characteristic or similar sheet characteristic from the DB when a new sheet is used.

The present invention has been made in view of the above-described circumstances, and an object of the present invention is to more efficiently determine a process condition suitable for physical property information of a recording sheet.

To achieve at least one of the abovementioned objects, according to an aspect of the present invention, a device reflecting one aspect of the present inventions comprises the followings.

A control device capable of outputting a process condition under which an image forming section performs image forming on a recording sheet, and the control device including a hardware processor that determines, based on physical property information corresponding to physical property of a recording sheet and read information on an image evaluated as abnormal through reading of an image on the recording sheet by a reading section on a recording sheet conveyance path, a process condition under which the image forming section performs image forming on the recording sheet.

To achieve at least one of the abovementioned objects, according to an aspect of the present invention, a device reflecting one aspect of the present inventions comprises the followings.

A control device capable of controlling an image forming section that performs image forming on a recording sheet, and the control device including a hardware processor that determines, based on read information corresponding to read image acquired by reading an image formed on a recording sheet by a reading section arranged on a recording sheet conveyance path and physical property information corresponding to physical property of the recording sheet on which an image read by the reading section is formed, process condition under which the image forming section performs image forming on the recording sheet.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 5 is a diagram indicating an example of accumulated data;

FIG. 7B is a flowchart illustrating processing subsequent to processing illustrated in FIG. 7A;

DETAILED DESCRIPTION OF EMBODIMENTS

Figure 1:
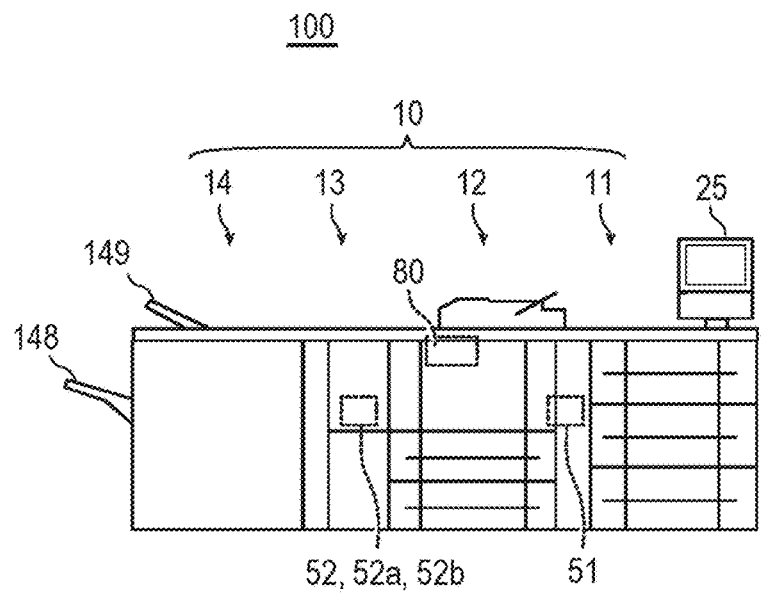
FIG. 1 is a front view illustrating an appearance of an image forming system according to an embodiment.

Hereinafter, an embodiment of the present invention will be described with reference to the attached drawings. However, the scope of the present invention is not limited to the disclosed embodiment. Note that in the description of the drawings, the same elements are denoted by the same reference signs, and redundant description thereof will be omitted. In addition, dimensional ratios in the drawings are exaggerated for convenience of description and may be different from actual ratios. In the present embodiment, a "recording sheet" include a print sheet (hereinafter, simply referred to as a sheet) and various films. In particular, the sheet includes a sheet produced using mechanical pulp and/or chemical pulp that are derived from plants. Examples of the types of sheets include gloss paper of coated paper (denoted by "CoatedG" in FIG. 5 described below), matte paper of coated paper (denoted by "CoatedM" in FIG. 5), plain paper and high-quality paper of non-coated paper, and the like. The recording sheet includes not only standard cut sheet but also non-standard long sheet (for example, having a long side of 900 min or more) or roll paper (having a winding length of several tens of meters).

Figure 2:
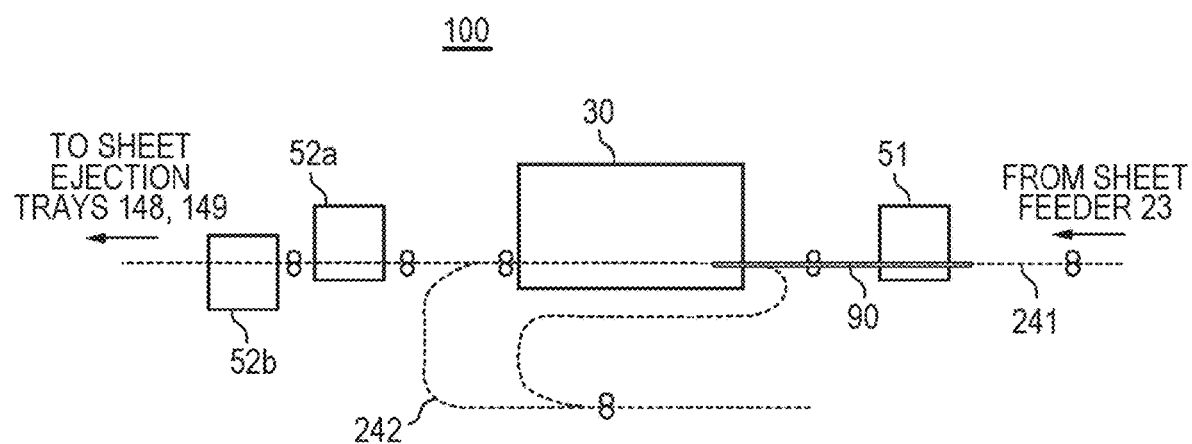
FIG. 2 is a schematic diagram illustrating components arranged on a conveyance path of the image forming system.
Figure 3:
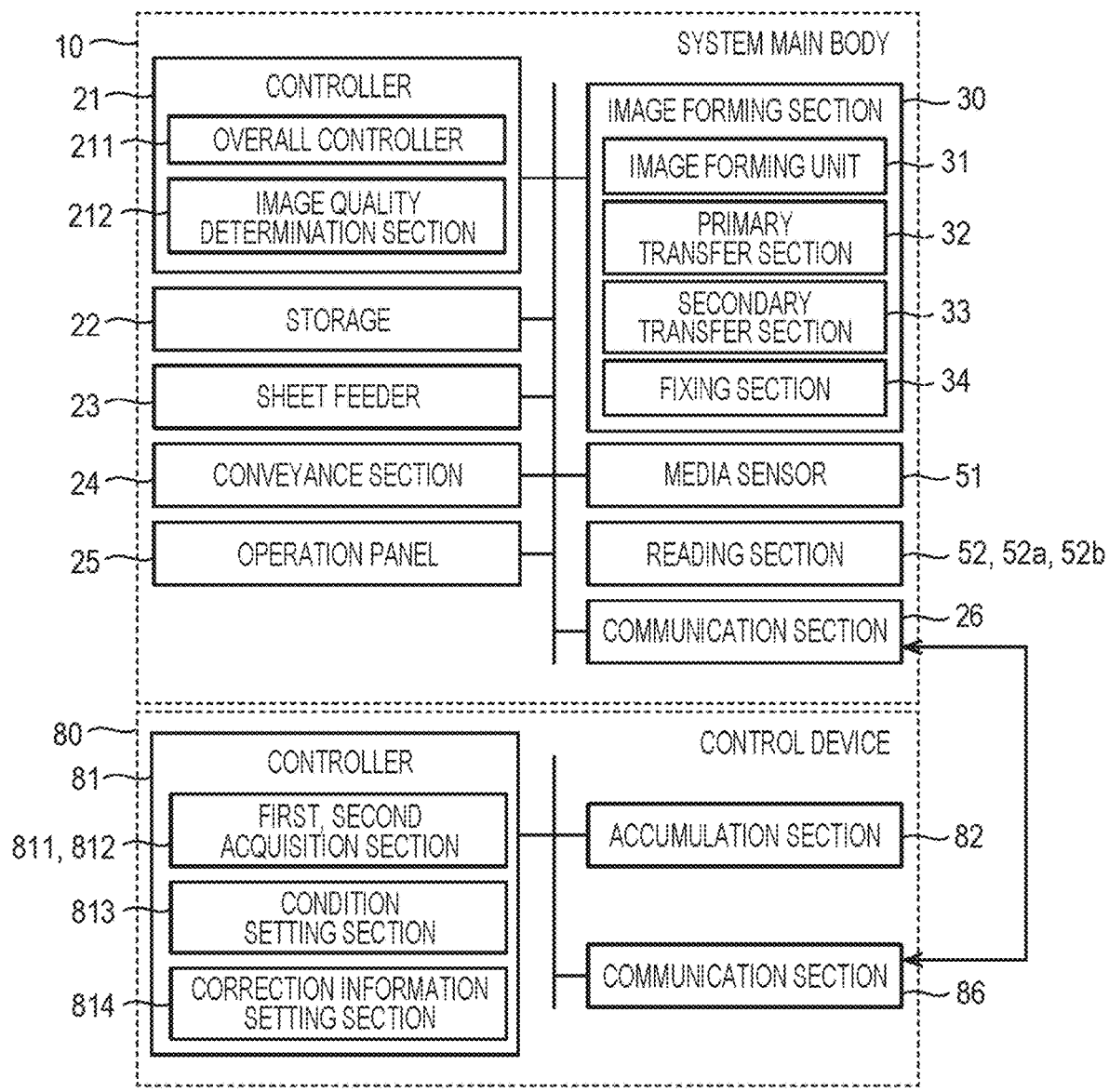
FIG. 3 is a functional block diagram illustrating a configuration of the image forming system.
Figure 4:
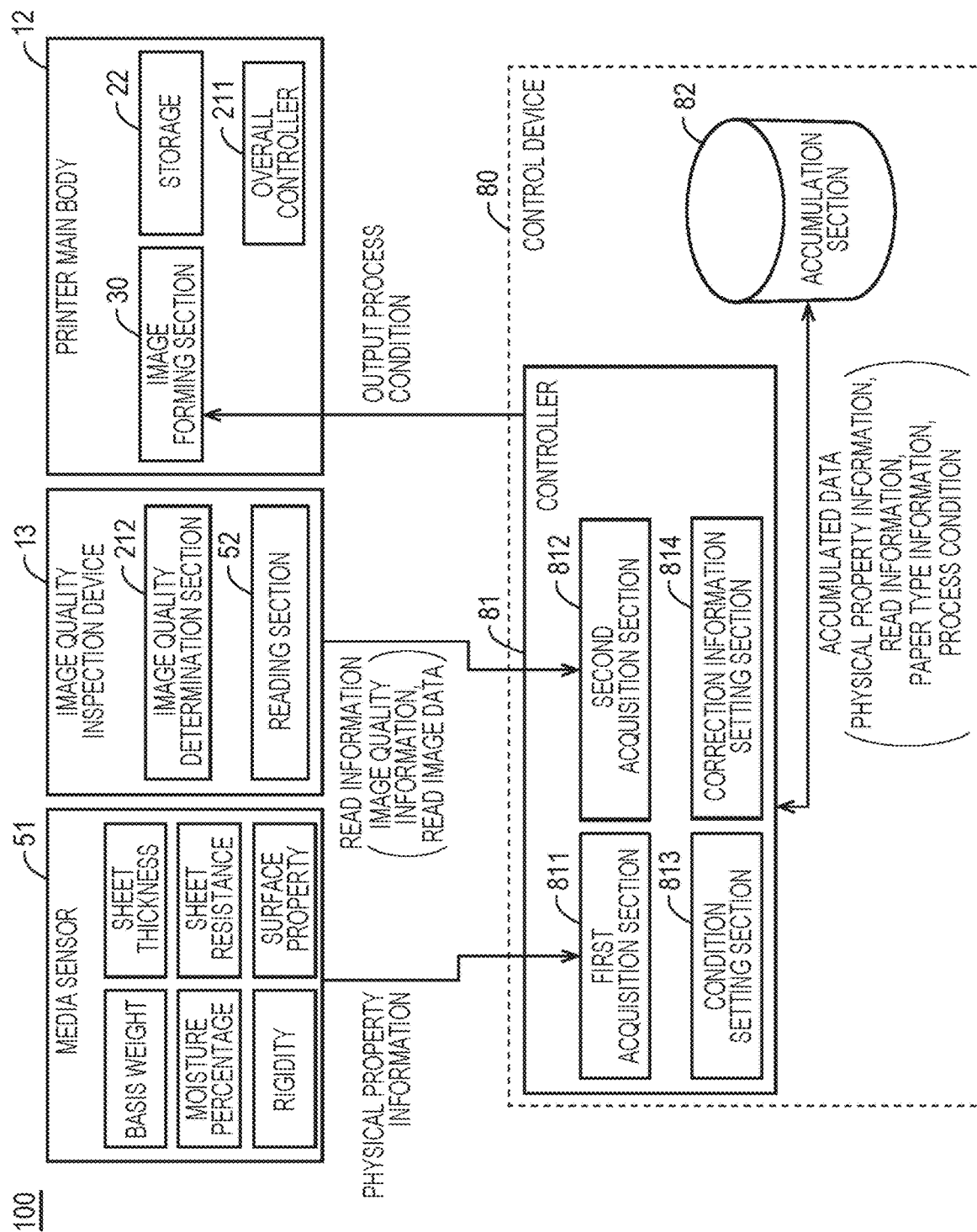
FIG. 4 is a functional block diagram illustrating a data flow in the image forming system.

FIG. 1 is a diagram illustrating a schematic configuration of an image forming system 100 according to the present embodiment. FIG. 2 is a schematic diagram illustrating components arranged on a conveyance path of the image forming system 100. FIG. 3 is a functional block diagram illustrating a configuration of the image forming system 100. FIG. 4 is a functional block diagram illustrating a data flow in the image forming system 100.

The image forming system 100 illustrated in FIG. 1 includes a sheet feed device 11, a printer main body 12, an image quality inspection device 13, a sheet ejection device 14, and a control device 80, which are mechanically and electrically connected to each other. The sheet feed device 11, the printer main body 12, the image quality inspection device 13, and the sheet ejection device 14 constitute a system main body 10. In addition, in the example illustrated in FIG. 1, the control device 80 is incorporated in the system main body 10 (in the printer main body 12, specifically). The sheet feed device 11 incorporates therein a large-capacity sheet feed tray, and supplies sheets to the printer main body 12. As will be described in detail below, the image quality inspection device 13 reads an image on a sheet 90 on which image forming is performed in the printer main body 12, and determines its image quality. The sheet ejection device 14 includes a plurality of sheet ejection trays 148 and 149, and conveys and ejects the sheet 90 sent from the upstream side. For example, the sheet 90 that is normal is ejected to the sheet ejection tray 148, and the sheet 90 that is defective (waste sheet) is ejected to the sheet ejection tray 149. In addition, various kinds of post-processing (stapling processing, folding processing, and cutting processing) may be performed in the sheet ejection device 14.

(System Main Body 10)

As illustrated in FIGS. 2 and 3, the system main body 10 includes a controller 21, a storage 22, a sheet feeder 23, a conveyance section 24, an operation panel 25, a communication section 26, the image forming section 30, a media sensor 51, and a reading section 52. The image forming section 30 is incorporated in the printer main body 12, and the reading section 52 is incorporated in the image quality inspection device 13.

(Controller 21)

The controller 21 includes a CPU and a memory. The CPU is a control circuit constituted by a multi-core processor that controls the above-described sections and executes various kinds of arithmetic processing according to a program and the like. Functions of the image forming system 100 are implemented by the CPU executing a corresponding program.

The controller 21 functions as an overall controller 211 and an image quality determination section 212. The overall controller 211 controls the entire system main body 10 including the printer main body 12. In particular, the overall controller 211 controls the output of each component (transfer section or the like) of the image forming section 30 according to the process condition set by the control device 80. The image quality determination section 212 controls the image quality inspection device 13 to generate image quality information (described later).

(Storage 22)

The storage 22 is a large-capacity auxiliary storage device that stores therein various types of programs including an operating system and various types of data.

(Sheet Feeder 23 and Conveyance Section 24)

The sheet feeder 23 includes a plurality of sheet feed trays. The conveyance section 24 includes a main conveyance path 241, a double-sided conveyance path 242, and a plurality of conveyance rollers arranged on these conveyance paths (also referred to as recording sheet conveyance path) and a drive motor. The sheet feed tray is arranged in the printer main body 12 and the sheet feed device 11. When roll paper is used, the sheet feed device 11 includes a winding core for roll paper instead of the sheet feed tray. The printer main body 12 or each sheet feed tray of the sheet feed device 11 stores therein sheets (cut sheet), and feeds the stored sheets one by one to the main conveyance path 241 of the conveyance section 24. The conveyance paths of the respective devices of the system main body 10 such as the sheet feed device 11 and the printer main body 12 are connected to each other, and as a whole, constitute a main conveyance path 241 from the sheet feeder 23 to the sheet ejection tray 148 (or the sheet ejection tray 149). In addition, in the double-sided conveyance path 242 of the conveyance section 24, processing is as follows when image forming is performed on both sides with the double-sided mode. The double-sided conveyance path 242 receives the sheet 90 on the front surface (first surface) of which an image is formed to reverse the front and back of the sheet 90, and then guides the sheet 90 again to the image forming section 30 arranged on the main conveyance path 241. Thereafter, an image is formed on the back surface (second surface) of the sheet 90 that has been conveyed in the image forming section 30.

(Operation Panel 25)

The operation panel 25 includes a touch panel, a numeric keypad, a start button, a stop button, and the like, and is used for displaying various kinds of information to the user and inputting various kinds of instructions. The user can set sheet information such as the size and the types of sheets stored in the respective sheet feed trays via the operation panel 25. The user can give an instruction to execute a print job via operation of the operation panel 25.

(Communication Section 26)

The communication section 26 is an interface for communicating with other devices such as the control device 80. The communication section 26 is also an interface for network connection with external devices such as a personal computer (PC).

(Image Forming Section 30)

The image forming section 30 forms an image by, for example, an electrophotographic method. The image forming section 30 includes four writing sections (not illustrated) corresponding to basic colors (Y, M, C, and K), four image forming units 31, and four primary transfer sections 32. The image forming section 30 also includes an intermediate transfer belt onto which the toner images formed by each of image forming units 31 are transferred and superimposed, a secondary transfer section 33, and a fixing section 34. The image forming units 31 each include a photosensitive drum, a developing device, a charging device, and a cleaning section (none of which is illustrated). The image forming units 31 for the respective colors have the same configuration except for the color of toner inside the developing device 32.

(Transfer Sections 32 and 33)

Each primary transfer section 32 includes a transfer roller arranged inside the intermediate transfer belt so as to face each photosensitive drum, and forms a primary transfer nip. The secondary transfer section 33 is biased toward a counter roller arranged on an inner peripheral surface of the intermediate transfer belt with a predetermined load to comes into contact with the counter roller via the intermediate transfer belt, thereby forming a secondary transfer nip. A pressing force at the transfer nip in the secondary transfer section 33 (hereinafter, referred to as transfer pressing force) is configured to be changeable by a load adjuster (not illustrated). In addition, a predetermined transfer current (or a predetermined transfer voltage) is applied to each transfer roller by a high-voltage power supply.

(Fixing Section 34)

The fixing section 34 performs fixing processing of heating and pressing on a toner image formed on the intermediate transfer belt by the image forming units 31 and the secondary transfer section 33 and the like arranged on the upstream side with respect thereto, thereby fixing the toner image on the sheet 90. The fixing section 34 includes a heater as a heating source, a thermometer, a heating roller, a pressuring roller, and the like. The controller 21 controls the amount of power supplied to the heater according to the surface temperature of the heating roller detected by the thermometer to make the heating roller have a predetermined control temperature (hereinafter referred to as a fixing temperature). In addition, a biasing force (also referred to as a fixing nip pressure or a fixing pressing force) of the pressuring roller to the heating roller is configured to be changeable by a load adjuster (not illustrated).

(Process Condition)

Note that in the present embodiment, a transfer condition and a fixing condition are included as a process condition set by the control device 80. In a case where the intermediate transfer belt is used in the above-described manner, the transfer condition targets a secondary transfer output (transfer current or transfer voltage) and a transfer pressing force in the secondary transfer section 33. The fixing condition targets a fixing temperature and a fixing pressing force in the fixing section 34.

Note that in a configuration without using the secondary transfer section (for example, a system in which a toner image on a photosensitive drum is directly transferred onto a sheet by a primary transfer section), the following occurs. The process condition set by the control device 80 targets the pressing force of the primary transfer section and the primary transfer output, which needs to be set according to the physical property information of the sheet.

(Media Sensor 51)

The media sensor 51 is constituted by a plurality of detectors each including a plurality of types of sensors different from each other. The media sensor 51 detects (determines) output values corresponding to a current, a voltage, a light reception amount, and the like of the respective sensors of the media sensor 51, that is, physical property information corresponding to physical property of the recording sheet. In the example illustrated in FIG. 2, the media sensor 51 is arranged on main conveyance path 241 upstream with respect to the image forming section 30, and detects the physical property information of the conveyed sheet 90. As illustrated in FIG. 4, the media sensor 51 includes, for example, a basis weight detector, a sheet thickness detector, a moisture percentage detector, a sheet resistance detector, a rigidity detector, and a surface property detector. The respective detectors each measure a physical property different from each other, and the media sensor 51 outputs the physical property information corresponding to the measurements. The physical property information includes not only the information that directly corresponds to the sheet physical property but also the information of the obtained measurement value, one or more of which are converted into the sheet physical property. Hereinafter, the sheet physical property directly obtained by the detectors or the measurement values are collectively referred to as the physical property information. The physical property information includes a plurality of elements (basis weight, thickness, moisture percentage, sheet resistance (volume resistance), smoothness, rigidity, and the like).

(Basis Weight Detector)

The basis weight detector, which is a sensor that detects the basis weight of the sheet 90, includes a light emitter and a light receiver and measures the basis weight by the attenuation amount of light transmitted through the sheet 90. For example, the basis weight sensor includes the light emitter arranged on one side of the main conveyance path 241 in which the sheet is conveyed and a light receiver arranged on the other side thereof and detects the basis weight of the sheet 90 based on the intensity of the light that is transmitted through the sheet 90 and is received by the light receiver.

(Sheet Thickness Detector)

The sheet thickness detector includes a pair of conveyance rollers at least one of which is movable according to the thickness of the sheet 90 passing through the nip between the conveyance rollers and a measurement section that measures the distance between the shafts of the pair of conveyance rollers. The measurement section includes, for example, an actuator, an encoder, and a light emitter and a light receiver. A shaft position of the movable driven roller is displaced according to the thickness of the sheet 90 sandwiched by the pair of conveyance rollers. The sheet thickness detector detects the thickness of the sheet 90 by measuring the height of the displaced shaft.

(Moisture Percentage Detector)

Figure 9:
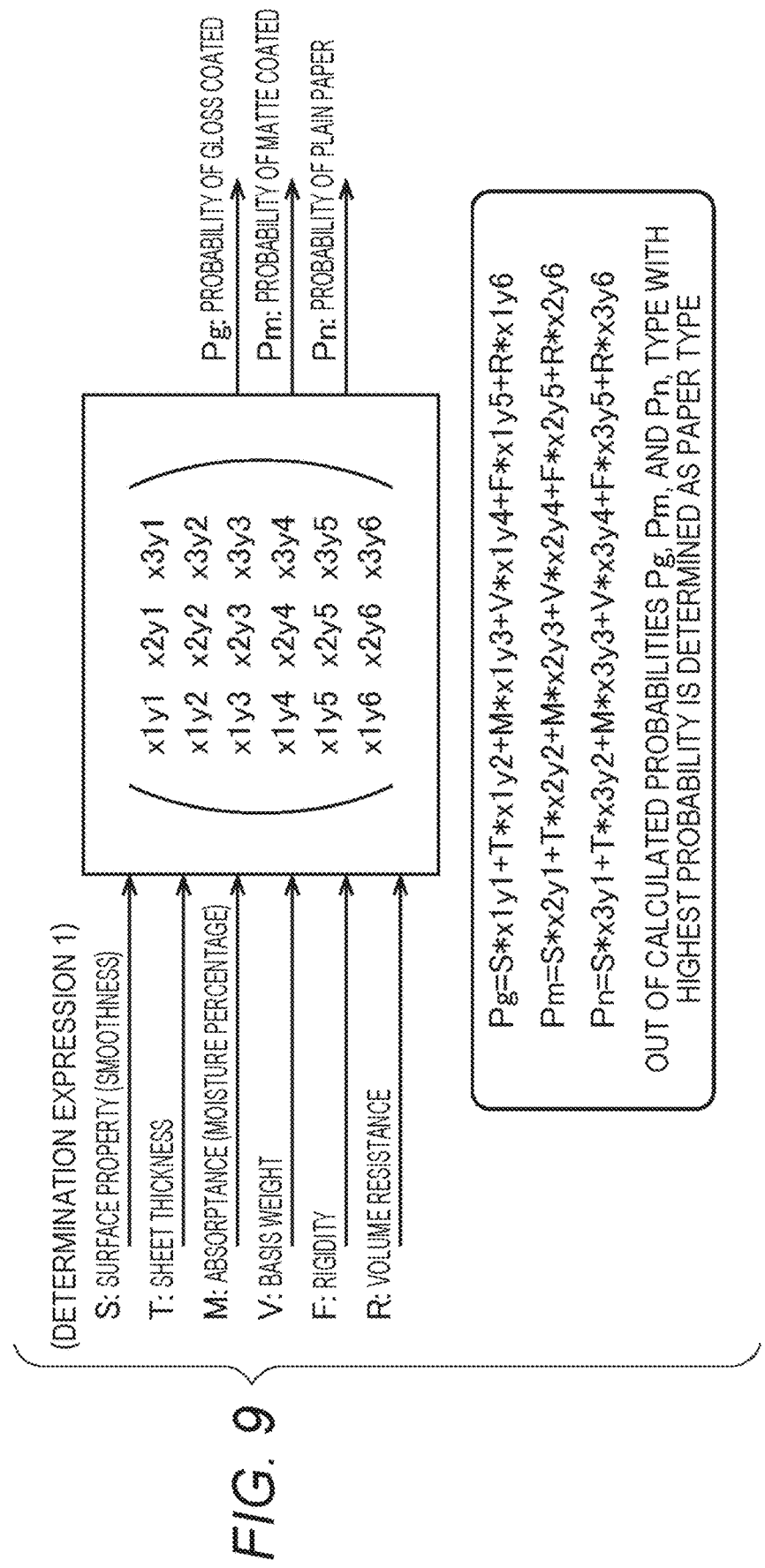
FIG. 9 is a diagram indicating an example of correction information (determination expression 1) used for determining a sheet type.
Figure 13A:
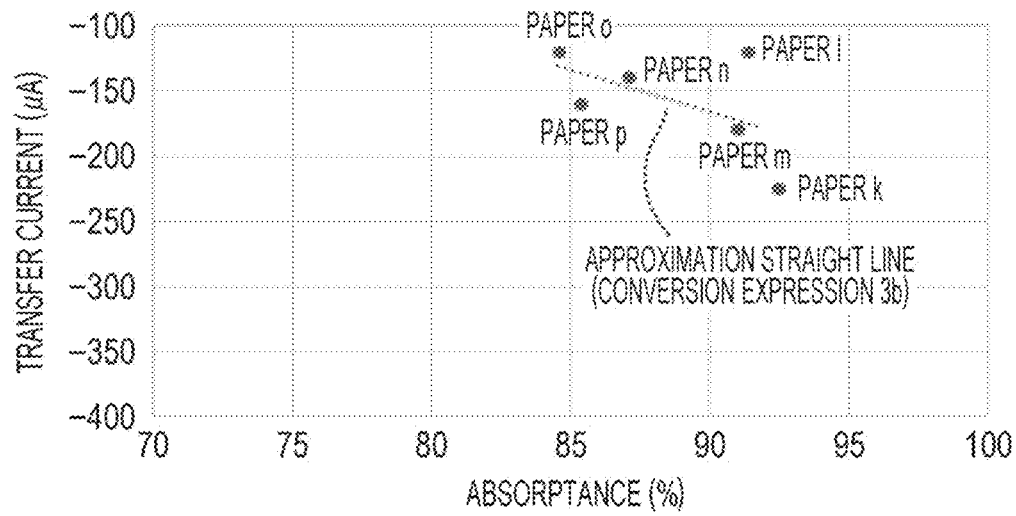
FIG. 13A is a graph indicating an example of correction information (conversion expression 3b) indicating a relationship between a moisture percentage (absorptance) and a transfer current in a case of matte coated paper.

The moisture percentage detector measures the moisture percentage (a physical property value relating to the moisture amount, also referred to as water content) of the sheet 90 conveyed through the conveyance path using an optical sensor. The moisture percentage detector includes a light emitting element, a light receiving element, and an optical element including a lens, an aperture, and collimating lens, and the like. The moisture percentage detector irradiates the sheet 90 with light having a predetermined wavelength in a near-infrared region from the light emitting element, and detects the reflected light with the light receiving element. The moisture percentage detector detects the moisture percentage of the sheet utilizing the property in which absorptance of light having a predetermined wavelength in a near-infrared region changes according to the moisture percentage of the sheet 90. Hereinafter, the absorptance may be described as its own numerical value without being converted into the moisture percentage (FIG. 9, FIG. 13A, and the like).

(Sheet Resistance Detector)

The sheet resistance detector detects the sheet resistance of the conveyed sheet 90. The sheet resistance detector includes a pair of conveyance rollers that sandwich the sheet 90 and a high voltage (HV) unit. When the sheet resistance is measured, the drive motor of the conveyance rollers is stopped at a predetermined detection position on the conveyance path to temporarily stop the sheet 90. In this state, a high voltage is applied to the upper roller (also referred to as a detection roller) of the pair of conveyance rollers by the HV unit, and a value of a current flowing through the lower roller (counter roller) grounded via the sheet 90 is measured.

(Rigidity Detector)

The rigidity detector detects, with the front end (or the rear end) of the sheet 90 being a free end, a bending rigidity of the sheet 90. The rigidity detector includes a holding member, a push-up member that pushes the sheet 90 upward from below, and a pressure detection sensor that detects the pressing force of the push-up member. The conveyance rollers are also used as the holding member. The contact surface of the push-up member with the sheet 90 is parallel to the axial direction of the conveyance rollers. The rigidity detector holds a portion slightly inside the end portion (edge) of the sheet 90 with the conveyance rollers and lifts up the front end of the sheet 90 that is the free end with the push-up member, thereby measures the rigidity of the sheet 90 based on the pressing force during lifting. The vertical movement of the push-up member is controlled by the drive motor, for example, a stepping motor. In the rigidity detector, the conveyance rollers are used as the holding member, and the contact surface of the push-up member with the held region (roller nip) is both in the conveyance direction of the sheet 90 and in the direction orthogonal to the sheet surface (conveyance surface) of the sheet 90. The rigidity detector measures the rigidity in the sheet conveyance direction.

(Surface Property Detector)

The surface property detector, which includes a housing, a light emitter, a collimating lens, and a plurality of light receivers (optical sensors), optically detects specular reflection light and diffuse reflection light from the sheet surface (irradiation surface) as described below. In the above-described manner, a characteristic of the coated layer of the sheet 90 is detected. One of guide plates in a sheet passing region in the conveyance path (main conveyance path 241) is provided with an opening (measurement region) and the opening serves as an irradiation region for the light receiver. The sheet 90 conveyed to the opening is pressed by a pressing mechanism descends from above in the sheet passing region. In the above-described manner, the sheet 90 around the opening (of the guide plate) is pressed by the lower guide plate and the pressing mechanism from above. With the state, irradiation light that has been substantially collimated by the collimating lens is emitted from the light emitter at an incident angle of 75° with respect to the reference surface. The wavelength of the irradiation light is, for example, 465 nm. The plurality of light receivers receives the specular reflection light and the diffuse reflection light. The plurality of light receivers is arranged, for example, at three positions of reflection angles of degrees (for diffuse reflection light), 60 degrees (for diffuse reflection light), and 75 degrees (for specular reflection light), or at two positions of 60 degrees and 75 degrees. With the absolute values and the ratio of the intensity of the light received by the respective light receivers, the surface property of the sheet 90 is detected. The glossiness (for example, the specular glossiness at an incident angle of 75 degrees) is measured by the surface property detector. Note that the gloss property detected by the surface property detector is not limited to the glossiness, and may be another characteristic as long as it is an index indicating the gloss.

(Image Quality Inspection Device 13)

The image quality inspection device 13 includes the reading section 52 and the image quality determination section 212. The reading section 52 reads an image formed on the sheet 90, generating read data. The image quality determination section 212 analyzes the read data, generating image quality information. The image quality inspection device 13 transmits, to the control device 80, the generated information as read information.

(Reading Section 52)

The reading section 52 is a so-called scanner. The reading section 52 is arranged on the main conveyance path 241 downstream with respect to the image forming section 30. As illustrated in FIG. 2, the reading section 52 includes two reading sections 52a and 52b having a common configuration so as to be able to read images on both sides of the sheet 90 conveyed through the main conveyance path 241. The reading section 52a is arranged on the upper side of the main conveyance path 241 so as to read an image on the image-formed surface in the single-sided mode or on the back surface (second surface) in the double-sided mode. The reading section 52b is arranged on the lower side of the main conveyance path 241 so as to read an image on the front surface (first surface) in the double-sided mode.

The reading section 52a reads an image formed on the sheet 90 by the image forming section 30, generating a read image (read image data) (the same applies to the reading section 52b). The reading section 52 includes a sensor array, an optical system, and an LED light source. The sensor array, in which a plurality of optical elements such as CCD is arranged in a line shape along the width direction (main scanning direction), is a color line sensor capable of reading the entire width range in the width direction of the sheet 90. The optical system includes a plurality of mirrors and lenses. The light from the LED light source irradiates a front surface of the sheet 90 passing a reading position on the main conveyance path 241. The image at the reading position is guided by the optical system and thus formed on the sensor array.

(Image Quality Determination Section 212)

The image quality determination section 212 analyzes the read image acquired through the reading by the reading section 52 to perform image quality determination. For example, in a certain region on the sheet, the image quality determination section 212 compares an image density of the read image with the density assumed from the image signal of the original print data (density in normal operation) to determine whether the image is abnormal or normal according to insufficiency of density. In addition, according to the degree of the insufficiency of density, an image quality level may be determined (for example, to five levels), and according to the image quality level, an image may be determined normal or abnormal (for example, the level is determined as normal, and the level 4 or less is determined as abnormal). The image quality determination section 212 may set a region on a sheet to be evaluated according to the original print data. For example, the image quality determination section 212 extracts, from the original print data, a region on which a moderately uniform high-density image is formed to set the region as a region to be evaluated. Alternatively, the image quality determination section 212 may determine the image quality in accordance with a color patch for evaluation, which is arranged in an edge region (the area outside the bleed) of the sheet 90. The edge region is a region that is trimmed off after the image formation to be discarded and is not used as a product.

(Control Device 80)

As illustrated in FIG. 3, the control device 80 includes a controller 81, an accumulation section 82, and a communication section 86. The communication section 86 is an interface for communicating with other devices such as the system main body 10.

(Controller 81)

The controller 81 includes a CPU and a memory. The CPU is a control circuit constituted by a multi-core processor that controls the above-described sections and executes various kinds of arithmetic processing according to a program and the like. Functions of the control device 80 are implemented by executing a corresponding program by the CPU. The controller 81 cooperates with the communication section 86 to function as a first acquisition section 811 and a second acquisition section 812. In addition, the controller 81 functions as a condition setting section 813 that sets a process condition of the image forming section 30, and a correction information setting section 814.

As illustrated in FIG. 4, the first acquisition section 811 acquires physical property information from the media sensor 51. In addition, the second acquisition section 812 acquires read information from the image quality inspection device 13. The read information is read image acquired by reading the image on the sheet 90 as described above. Alternatively, the read information includes the read image and the image quality information, which is an evaluation result of image quality based on the read image. The condition setting section 813 sets, based on the physical property information and the read information, a process condition for performing image forming on the sheet 90. In addition, the condition setting section 813 uses the physical property information and the read information acquired by the first acquisition section 811 and the second acquisition section 812, the accumulated data accumulated in the accumulation section 82, and the correction information. The condition setting section 813 sets, based on these pieces of information, a process condition for performing image forming on the sheet 90. The correction information setting section 814 generates correction information based on the accumulated data accumulated in the accumulation section 82. The correction information includes a correction coefficient calculated by performing regression analysis on the accumulated data. In addition, the correction information setting section 814 acquires the correction information corresponding to the physical property information (paper type) acquired by the first acquisition section 811. The correction information acquired or generated by the correction information setting section 814 is used by the condition setting section 813.

(Accumulation Section 82)

As the accumulation section 82, a hard disk, a solid-state drive, or the like is adopted. Every time printing is performed in the image forming system 100, physical property information by the media sensor 51 and read information by the image quality inspection device 13 are acquired from the sheet 90. In addition to the physical property information and the read information, the control device 80 acquires the process condition that has been used when performing image forming on the sheet 90 and stores, in the accumulation section 82, these three pieces of information in association with each other. FIG. 5 is a diagram indicating an example of accumulated data accumulated in the accumulation section 82. Data items in the accumulated data include a device ID (system main body ID), a print job ID, a printing date and time, and physical property information a, a paper type, image quality information b, and a process condition c of the sheet 90 used for printing. The types of image quality for which the image quality level is determined include density abnormality, density unevenness, and a white void. The density abnormality, which is also called poor transfer, is an image quality abnormality caused by insufficient transfer of toner on the intermediate transfer belt onto the sheet 90 due to an insufficient transfer current (or transfer voltage). The density unevenness is density non-uniformity caused by partial insufficient transfer. The white void is also referred to as a white spot. The white void is a transfer failure caused by abnormal discharge generated in an extremely small gap between the sheet 90 that approaches the transfer nip, and the secondary transfer roller (intermediate transfer belt) in a case where the transfer current (or the transfer voltage) is excessive. The types of image quality for which the image quality level is determined may further include image scattering. The determination of the image quality by the image quality determination section 212 can be performed by known processing of comparing a read image with original print data.

(Another Configuration Example)

Figure 6:
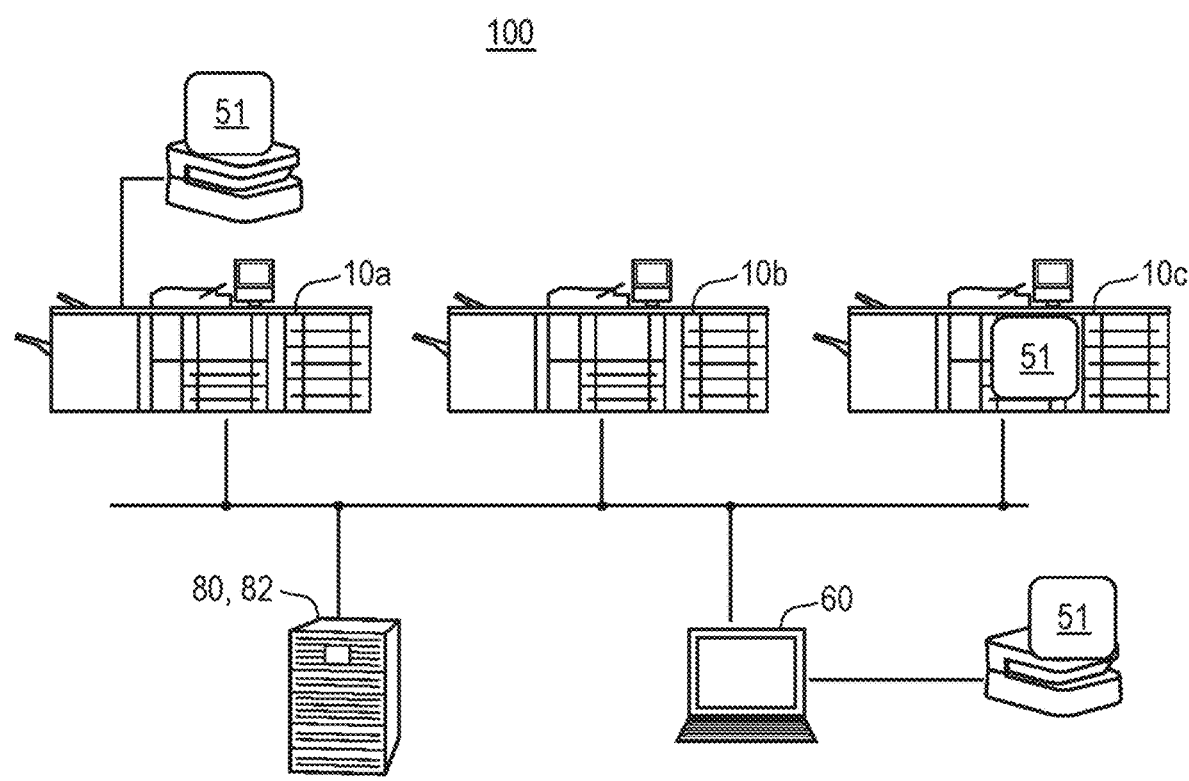
FIG. 6 is a diagram illustrating a schematic configuration of an image forming system including a plurality of image forming system main bodies and a control device in another example.

FIG. 6 is a diagram illustrating a configuration example of an image forming system including a plurality of image forming system main bodies and a control device in another example.

In the example illustrated in FIGS. 1, 2, and the like, in the image forming system 100 that is standalone, the media sensor 51 and the reading section 52 are arranged on the main conveyance path 241 of the main body. In addition, although an example in which the control device 80 is incorporated in the system main body 10 has been described, the present invention is not limited to the example. Alternatively, a configuration as illustrated in FIG. 6 may be adopted. FIG. 6 illustrates a system, for example, arranged in a building of one print shop, and a plurality of system main bodies 10*a*, 10*b*, and 10*c*, a control device 80, PC 60, and the like are communicably connected to each other via a network.

In the example illustrated in FIG. 6, the media sensor 51 is not incorporated in the system main bodies 10*a* and 10*b*. Meanwhile, the system main body 10*c* includes therein the media sensor 51 similarly to the example illustrated in FIG. 1. The system main body 10*a* acquires a measurement result by the media sensor 51 that is external and directly connected via a USB or the like. Each physical property is detected by the external media sensor 51 when the sheet 90 is inserted until the detection position by a manual operation (handwork) by a user. The system main body 10*b* acquires the measurement result by the media sensor 51 connected to the PC 60 or the measurement result by the medium sensor 51 connected to another system main body, such as the system main body 10*a*. In addition, as illustrated in FIG. 6, the control device 80 may be configured separately from the system main body 10. In this case, the control device 80 acquires the physical property information, the read information, and the process condition of the sheet 90 used for printing, from the plurality of system main bodies 10*a*, 10*b*, and 10*c* to collect these pieces of data in the accumulation section 82.

(Process Condition Setting Processing)

Hereinafter, a process condition setting processing performed by the control device 80 or the image forming system 100 including the control device 80 will be described with reference to FIGS. 7A to 12.

Figure 7A:
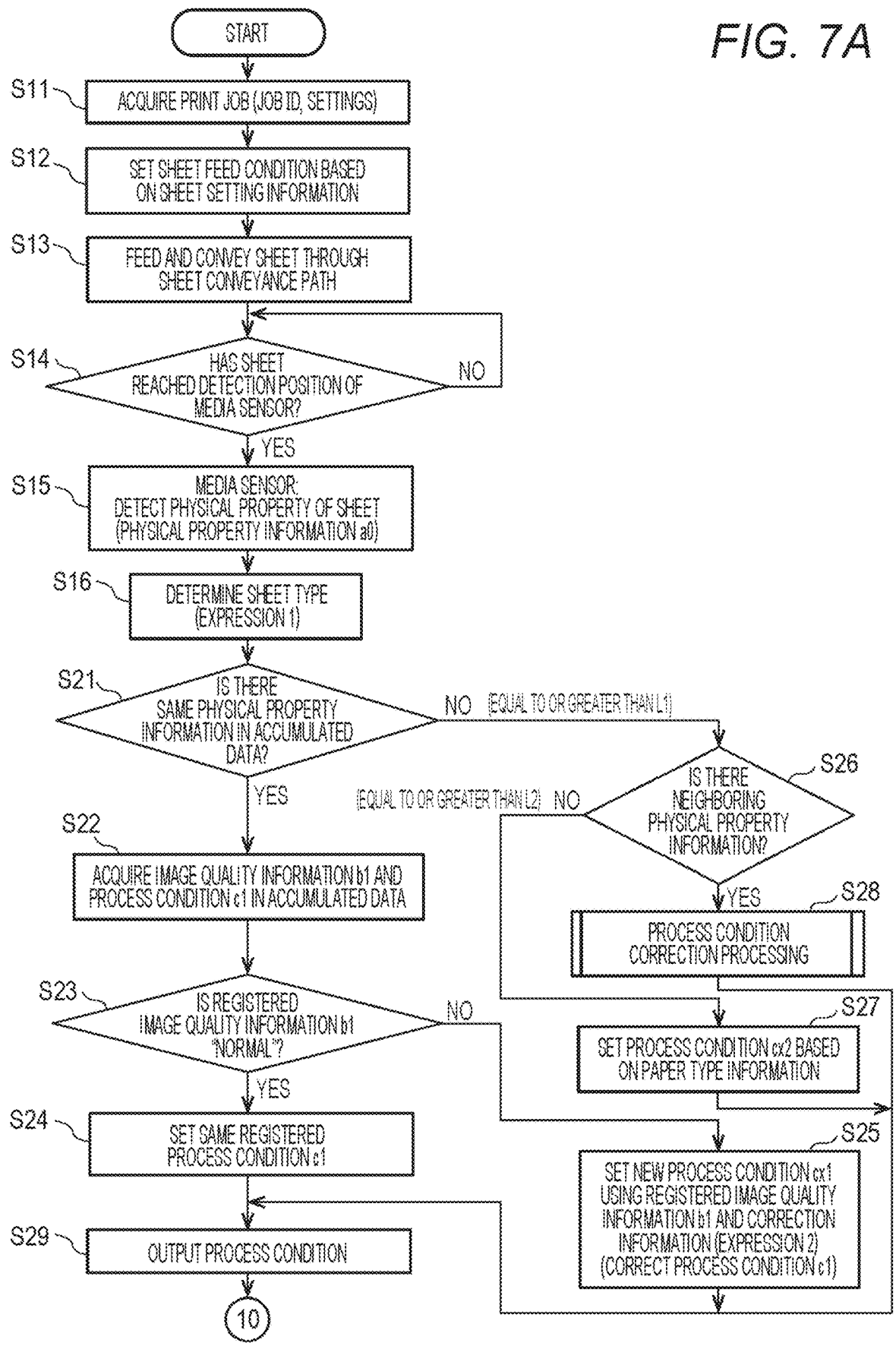
FIG. 7A is a flowchart illustrating a process condition setting processing according to a first embodiment.

FIGS. 7A and 7B are flowcharts illustrating the process condition setting processing.

(Step S11)

In the step, the image forming system 100 acquires a print job. The print job is received via the operation panel 25 or from a PC connected to the image forming system 100 or the like. The print job includes the original print data (print image data) and print settings (sheet type, sheet size, the number of sheets, mode, and the like), and a print job ID is assigned every time a print job is issued.

(Step S12 and S13)

The controller 21 sets a sheet feed condition according to sheet setting information (information on sheet size, paper type, and the like) of print settings, then starts feeding of the sheet 90 from the sheet feed tray corresponding to the settings to convey the sheet 90 through the main conveyance path 241.

(Step S14 and S15)

When the sheet 90 has reached the detection position of the media sensor 51, the controller 21 causes the media sensor 51 to detect the physical property of the sheet 90 to acquire physical property information (physical property information a0). Note that in the example as illustrated in FIG. 6, a user detects the sheet 90 to be used for printing of the print job by using the external media sensor 51, and associates the acquired physical property information with the print job. The first acquisition section 811 of the control device 80 acquires the associated physical property information.

(Step S16)

The first acquisition section 811 of the control device 80 acquires the physical property information from the system main body 10 to determine the sheet type (paper type). For the determination, A determination expression 1 indicated in FIG. 9 is used. In the determination expression 1, the surface property (S), the sheet thickness (T), the absorptance (M), the basis weight (V), the rigidity (F), and the volume resistance (R) in the physical property information acquired in step S15 are used as inputs. In the determination expression 1, the probabilities (also referred to as likelihood) of the respective types, which are the gloss coated paper, the matte coated paper, and the plain paper, are output with these inputs. The output probabilities Pg, Pm, and Pn of the respective types are compared with each other to determine the type with the highest probability as the paper type.

(Step S21)

Next, the controller 81 of the control device 80 searches the accumulation section 82 to determine whether or not there is accumulated data having the same physical property information as the physical property information a0 acquired in step S15. For example, a case is assumed in which each value of the plurality of elements of physical property information is within a range of a difference L1 that is set in advance (the L1 is different for each element of the physical property information), and is considered to be the same. In this case, it is determined that accumulated data with the same physical property information exists in the accumulation section 82 (YES), and the processing proceeds to step S22. On the other hand, in a case where there is no data with the same physical property information (NO), the processing proceeds to step S26.

(Step S22)

The controller 81 acquires, out of the accumulated data, the accumulated data having physical property information with the same value as the value of the physical property information a0 acquired in step S15 to acquire the image quality information and the process condition thereof. For example, a case is assumed in which the physical property information a0 acquired in step S15 can be considered the same as the past physical property information of the job ID J-1 illustrated in FIG. 5. In this case, the image quality information b and the process condition c of the job ID J-1 are acquired (hereinafter, referred to as image quality information b1 and process condition c1, respectively. and the same applies hereinafter).

(Step S23)

The controller 81 determines whether or not the image quality information b1 of the accumulated data is at a normal level. For example, in the example illustrated in FIG. 5, image quality is classified into five levels of level 1 to level 5, and the threshold is set to level 4.5. A level equal to or higher than level 4.5 is set as normal. In a case where the image quality level of all of the types is equal to or higher than the threshold of level 4.5 (that is, level 5)), the evaluation result is classified as "normal". On the other hand, in a case where any one of the types is considered as abnormal (the level of which is less than the threshold of level 4.5, that is, any one of levels 4, 3, 2, and 1), the evaluation result is classified as "abnormal".

For example, in FIG. 5, since the example of the job ID J-1 is classified as "normal", the processing proceeds to step S24, and since the example of the job ID J-2 is classified as "abnormal", the processing proceeds to step S25.

(Step S24)

In the step, the process condition of the past job can be used as it is. Thus, the condition setting section 813 sets, as a process condition to be used for image formation described later (hereinafter, referred to as output process condition), a process condition c1 that is the same as the history date.

(Step S25)

Figure 10:
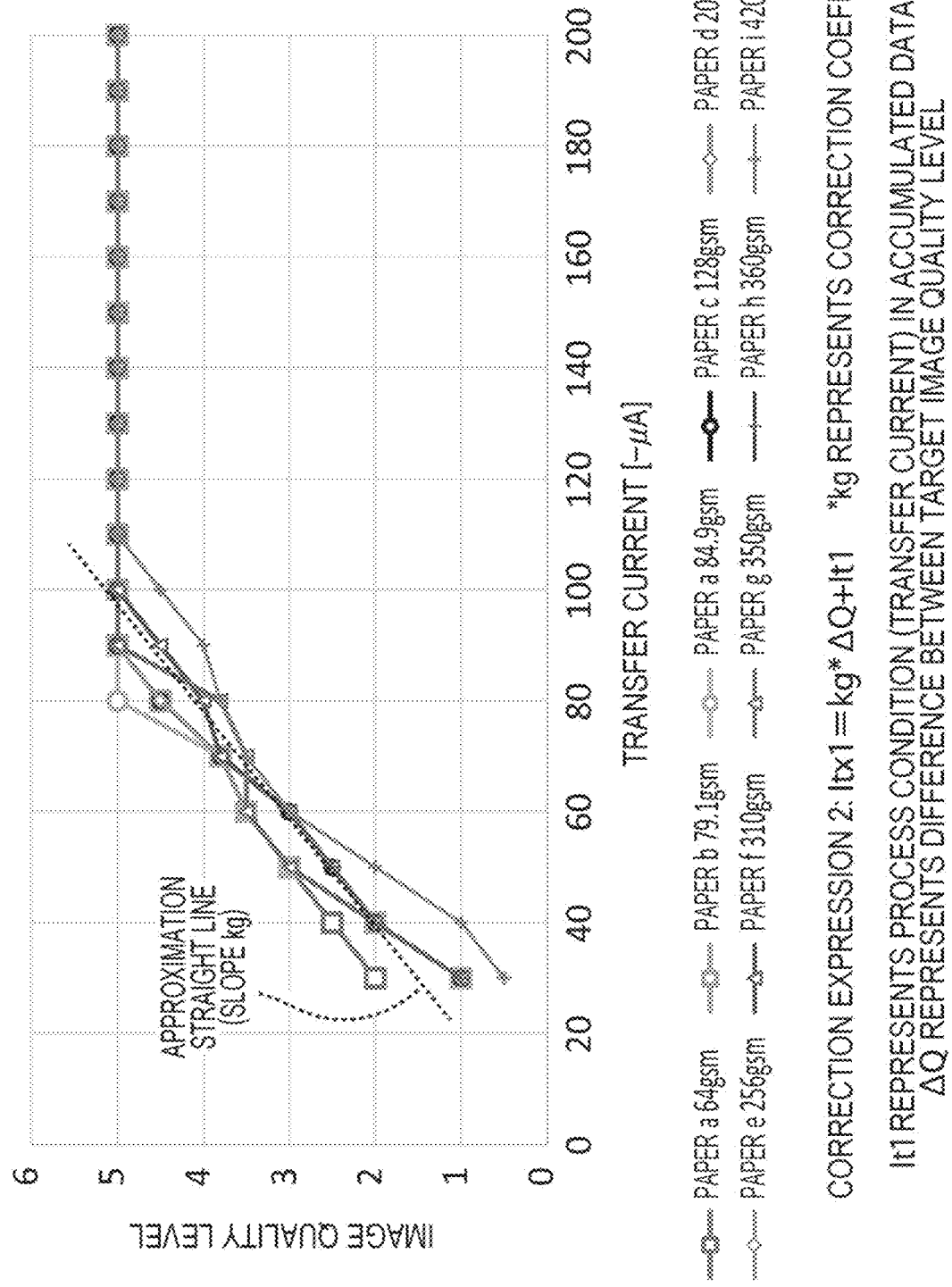
FIG. 10 is a graph indicating an example of correction information (correction expression 2) for setting a process condition from image quality information.

In this case, if the process condition in the past job is applied, there is a high possibility that the image quality defect thereof is reproduced. Thus, the condition setting section 813 changes the process condition c1 recorded in the accumulated data using the correction information (correction expression 2). The correction expression 2, which is stored in advance in the accumulation section 82, is previously set by a user based on a plurality of pieces of accumulated data. Alternatively, the correction expression 2 is previously set and is periodically updated by the correction information setting section 814. FIG. 10 is a graph indicating a relationship between the transfer current and the image quality level relating to poor transfer for a plurality of paper types (brand sheets a to i) of gloss coated paper. The paper type is determined, through the processing in step S16, as gloss coated paper. As described above, the target image quality level is level 4.5. In a case where the image quality level is level 3, which is abnormal, $\Delta Q$ is 1.5 (=4.5-3). A value is obtained as a correction amount by multiplying the above-described value by the correction coefficient kg. Then, the correction amount is added to the process condition c1 (It1), thereby a corrected process condition cx1 (Itx1) is calculated. As indicated in FIG. 10, the correction coefficient kg describes the slope of the image quality level with respect to the transfer current, and is derived from the correlation of data for a plurality of sheets of the same paper type. As the correction information (correction expression 2), correction information different for each type of image quality and for each paper type (gloss coated, mat coated, and plain paper) is stored in the accumulation section 82. The condition setting section 813 performs setting for the output process condition (sets the process condition cx1) using the correction information corresponding to the paper type and the type of image quality (determined as abnormal). Note that a process condition setting range is limited in advance, and in a case where the process condition cx1 exceeds the setting range, the process condition setting section 813 re-sets, as the output process condition, a process condition that makes image quality achieve the highest level within the setting range. Alternatively, as another example, a process condition that makes image quality achieve the highest level, which is level 5, may be set.

(Step S26)

Processing in step S26 and subsequent steps is the processing that is performed in a case where the same physical property information (physical property information considered as the same) is not accumulated. The condition setting section 813 of the control device 80 searches the accumulation section 82 to determine whether or not there is accumulated data having the neighboring physical property information of the physical property information a0 acquired in step S15. For example, a case is assumed in which each value of the plurality of elements of physical property information is within a range of a difference L2 that is set in advance (the L2 is different for each element of the physical property information, and is greater than the L1), and is considered to be neighboring. In the above-described case, the condition setting section 813 determines that accumulated data having the neighboring physical property information exists in the accumulation section 82 (YES), and the processing proceeds to step S28. On the other hand, in a case where there is no neighboring physical property information in the accumulated data (NO), the condition setting section 813 proceeds the processing to step S27.

(Step S27)

In the step, the condition setting section 813 sets the process condition cx2 as the output process condition based on the paper type information. The above-described setting can be performed by referring to a control table stored in advance in the accumulation section 82. The paper type information is the information on paper type included in the setting information acquired in step S11 or the information on paper type determined in step S16.

(Step S28)

Figure 8:
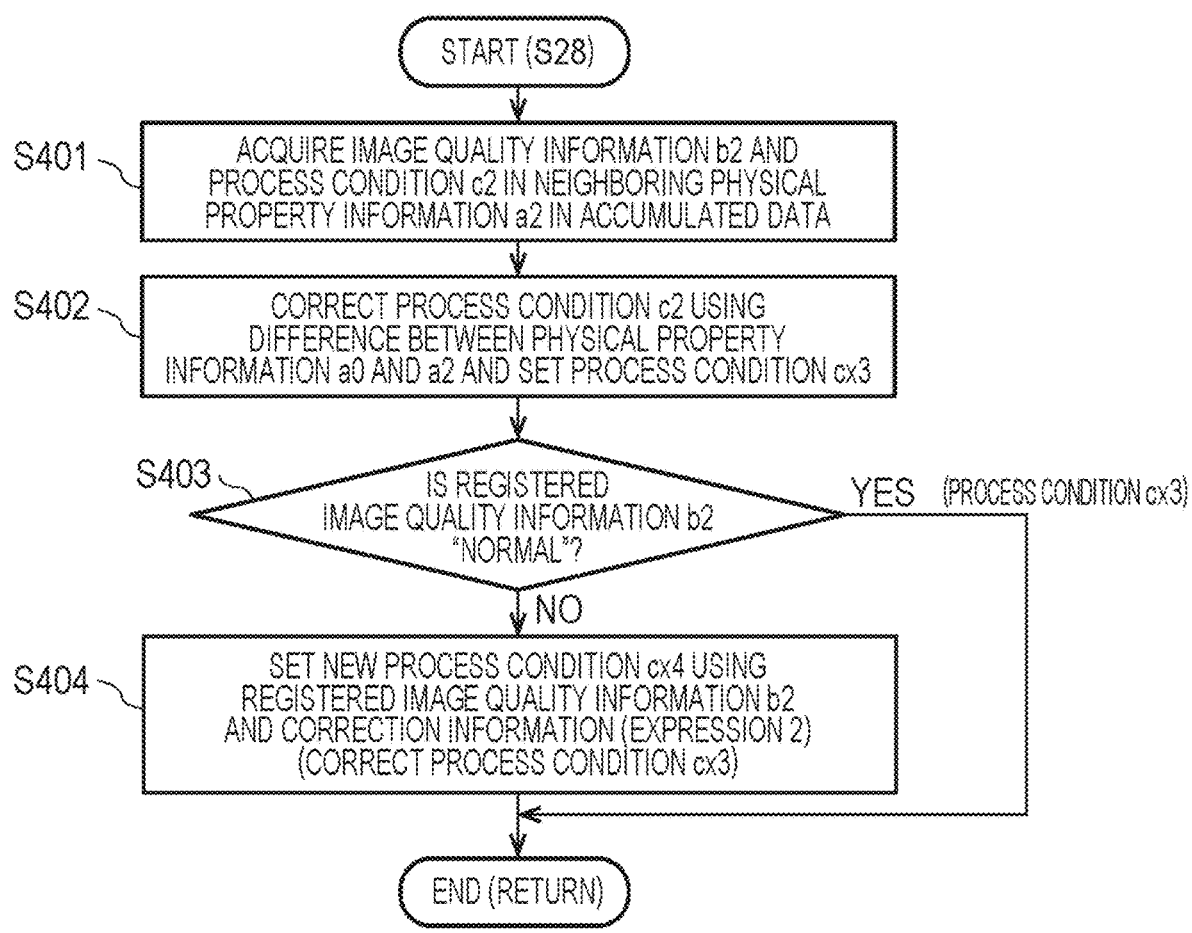
FIG. 8 is a subroutine flowchart illustrating correction processing in step S28.

In the step, the controller 81 performs setting for the output process condition through the correction processing using the process condition of the neighboring physical property information (hereinafter, referred to as physical property information a2 and process condition c2) by the following processing. FIG. 8 is a subroutine flowchart illustrating the processing in step S28.

(Step S401)

In the step, the controller 81 acquires, from the accumulation section 82, the image quality information b2 and the process condition c2 described in the accumulated data of the neighboring physical property information a2. Note that in a case where there is a plurality of pieces of accumulated data having neighboring physical property information of the physical property information a0 acquired in step S15, accumulated data having the physical property information closest thereto is used. The closest physical property information is determined, for example, to the physical property information having the shortest Euclidean distance (root mean square) or the physical property information that is close in the priority element set in advance.

(Step S402)

Figure 11:
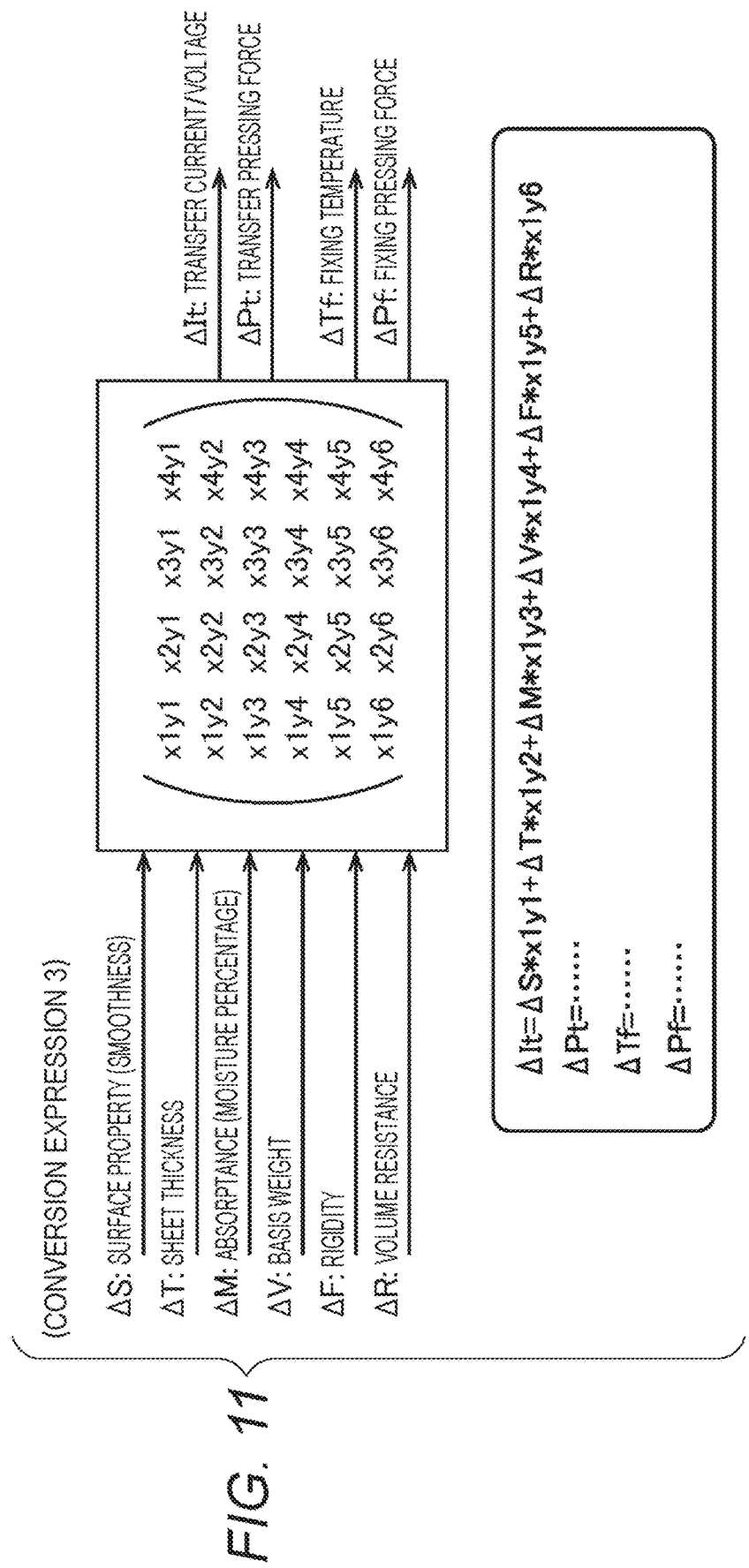
FIG. 11 is a diagram indicating an example of correction information (conversion expression 3) for calculating a process condition correction amount from difference data of physical property information.

The condition setting section 813 corrects the process condition c2 using the difference data between the physical property information a0 and the physical property information a2 and the correction information (conversion expression 3), calculating the process condition cx3. FIG. 11 indicates an example of the correction information (conversion expression 3) for calculating a process condition correction amount from the difference data of the physical property information used for the processing in step S402. In conversion expression 3, the difference data of each element ($\Delta S$, $\Delta T$, $\Delta M$, $\Delta V$, $\Delta F$, and $\Delta R$) between the two pieces of physical property information acquired in step S15 and S401 is used as inputs. Then, with respect to the inputs, for example, correction amounts $\Delta It$, $\Delta Pt$, $\Delta Tf$, and $\Delta Pf$ of the process condition (transfer current It, transfer pressing force Pt, fixing temperature Tf, and fixing pressing force Pf) are output in the conversion expression 3. By adding each output correction amount to the corresponding element in process condition c2, a process condition cx3 is calculated.

(Step S403)

The controller 81 determines whether or not the image quality information b2 in the accumulated data having the neighboring physical property information a2 acquired in step S401 is at a normal level. This processing is similar to the processing in the above-described step S23. In a case of abnormal, the controller 81 proceeds the processing to step S404. On the other hand, in a case of normal, the controller 81 ends the subroutine processing illustrated in FIG. 8 and returns to the processing illustrated in FIG. 7A In a case of normal, the process condition cx3 set in step S402 is adopted as the output process condition.

(Step S404)

In the step, the condition setting section 813 performs processing similar to the processing in step S25. In step S404, a correction amount is calculated based on the image quality level of the image quality information b2 acquired in step S401 and the correction information (correction expression 2). Then, the value is added to the process condition cx3, thereby a corrected process condition cx4 is calculated. The condition setting section 813 sets the process condition cx4 that has been calculated as the output process condition.

Then, the controller 81 ends the subroutine processing illustrated in FIG. 8, and returns to the processing illustrated in FIG. 7A.
(Step S29)

In the step, the control device 80 transmits, to the printer main body 12, the output process condition for which the setting is performed in any of steps S24, S25, S27, S402, and S404. The process condition set in the above individual step is the process condition c1, cx1, cx2, cx3, or cx4.
(Step S31)

FIG. 7B illustrates processing to be performed subsequent to the processing illustrated in FIG. 7A. The overall controller 211 causes the image forming section 30 to form an image on the sheet 90 having the physical property information a0 acquired in step S15, using the process condition output in step S29. Note that in a case where printing is continuously performed, the processing in steps up to this point of S14 to S29 may be applied to all of sheets 90, or a part of the processing may be omitted for the second and subsequent sheets of the sheets 90. For example, in a case where the sheets 90 are continuously fed from the same sheet feed tray to perform image forming thereon in the same print job, the processing in steps S14 to S29 by the media sensor 51 may be omitted for the second and subsequent sheets of the sheets 90. Alternatively, the processing in steps S14 to S29 may be performed only on a part of the sheets 90 by thinning out the sheets 90 at a predetermined interval (for example, each several tens or several hundreds of sheets). In this case, in the image forming system 100, the process condition that is set based on the physical property information a0 acquired in the processing on the first sheet or the like of the sheets 90 is commonly applied to the second and subsequent sheets thereof.
(Step S32 and S33)

Processing in step S32 and subsequent steps is processing for accumulating accumulated data in the accumulation section 82. A case is assumed in which the conveyed sheet 90 on which an image forming has been performed reaches the image inspection position (S32: YES). In this case, in addition to reading the image on the sheet 90 by the reading section 52 to generate the read image, the image quality inspection device 13 inspects the read image to determine the image quality and generate an evaluation result (image quality information). In a case where the evaluation result of the image on the sheet 90 is "abnormal", the system main body 10 ejects the sheet 90 as a waste sheet (defective product) to the sheet ejection tray 149. For example, a case is assumed in which image forming is performed under the process condition cx2 (step S27) or the like, and through the evaluation result of abnormal, a waste sheet is obtained. In this case, reprinting is performed based on the original print data. For the reprinting, even in a case of the same sheet 90 having the same physical property information, the different process condition cx1 is set through step S25.
(Step S34)

The second acquisition section 812 of the control device 80 acquires the read information (read image, image quality information) generated in step S33. The control device 80 associates the read information (read image, image quality information) with the physical property information a0 acquired in step S15 and the process condition output in step S29. Then, the control device 80 registers the associated information in the accumulation section 82 as the accumulated data (see FIG. 5). The accumulated data includes not only data in a case where the image quality information is normal but also data in a case where the image quality information is abnormal. Accumulating not only normal data but also abnormal data enables data collection in a wider range. The control device 80 can more accurately set an appropriate process condition using accumulated data accumulated in the wider range. In addition, the correction information setting section 814 may calculate and update the correction information (correction expression 2, conversion expression 3) every time new accumulated data is registered or every time a predetermined number of accumulated data are additionally registered.

As described above, the control device according to the present embodiment includes a controller (condition setting section) that sets (determines) a process condition for performing image forming on a recording sheet based on physical property information and read information acquired by the first and second acquisition sections. In addition, the evaluation result of the image quality of the image quality information included in the read information includes a case of abnormal. The controller (condition setting section) sets a process condition using accumulated data accumulated in the accumulation section.

Thus, an appropriate process condition can be set according to physical property information of a recording sheet. Accumulated data in which read information, physical property information, and a process condition that are stored in association with each other is utilized to determine a process condition suitable for newly detected physical property information. Thus, even in a case of using a new recording sheet, an appropriate process condition can be quickly set. In particular, since the accumulated data includes data of the evaluation result in a case of abnormal, a large amount of data in a wide range can be accumulated, and a more appropriate process condition can be set, accordingly.

In addition, the types of image quality include at least one of density abnormality, density unevenness, a white void, and image scattering, so that it is possible to set an appropriate process condition according to the specified defect type. In addition, according to the present embodiment, the evaluation of the image quality is converted into a numerical value (evaluation level), so that the process condition can be corrected using the relational expression between the image quality and the process condition (correction expression 2). With this correction, appropriate process condition can be set. In addition, the process condition includes only a transfer condition and a fixing condition, which are easily influenced by the physical property of the recording sheet, and a condition for controlling the transfer condition and the fixing condition. With this arrangement, it is possible to effectively acquire the optimal image quality while suppressing the accumulated data size. As the physical property information detected by the media sensor, at least one of the moisture percentages, the smoothness, and the thickness of the recording sheet is used, so that an accurate process condition can be set. In addition, according to the present embodiment, the data is updated and new accumulated data is added for every output of an image, so that an optimal process condition can be set more accurately and quickly. In addition, according to the present embodiment, the relationship between the physical property information and the image quality information can be defined accurately by determining the paper type information from the physical property information acquired by the media sensor, so that a process condition can be set accurately.
(Modification)

Figure 12:
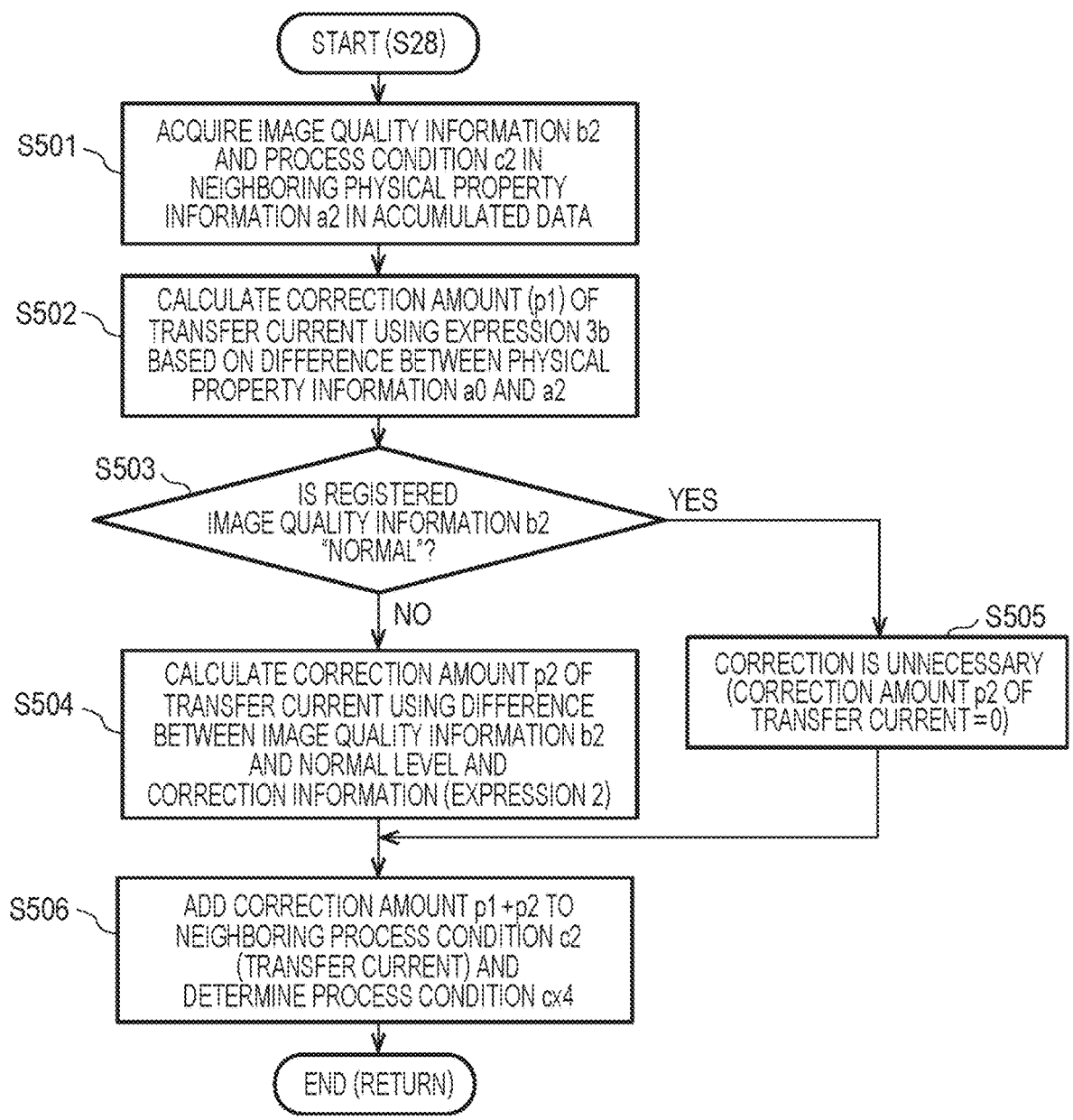
FIG. 12 is a subroutine flowchart illustrating the correction processing in step S28 in a modification.
Figure 13B:
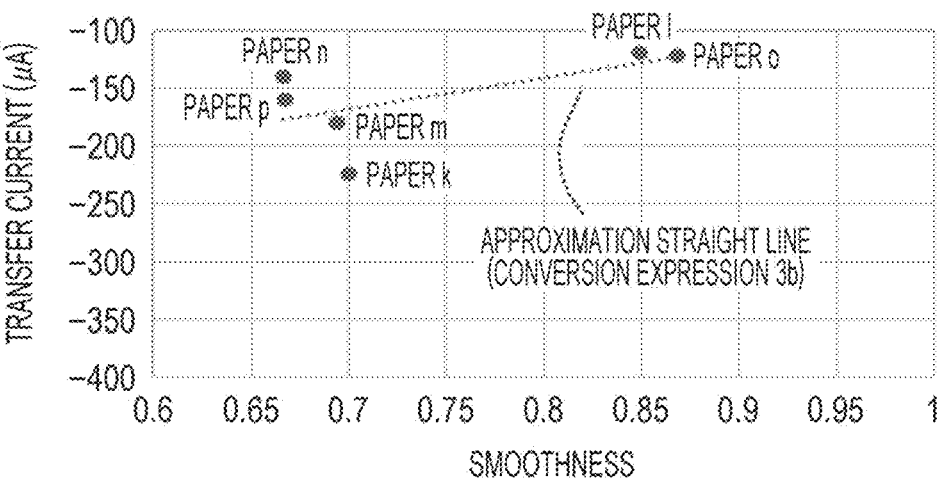
FIG. 13B is a graph indicating an example of correction information (conversion expression 3b) indicating a relationship between smoothness and a transfer current in a case of matte coated paper.
Figure 13C:
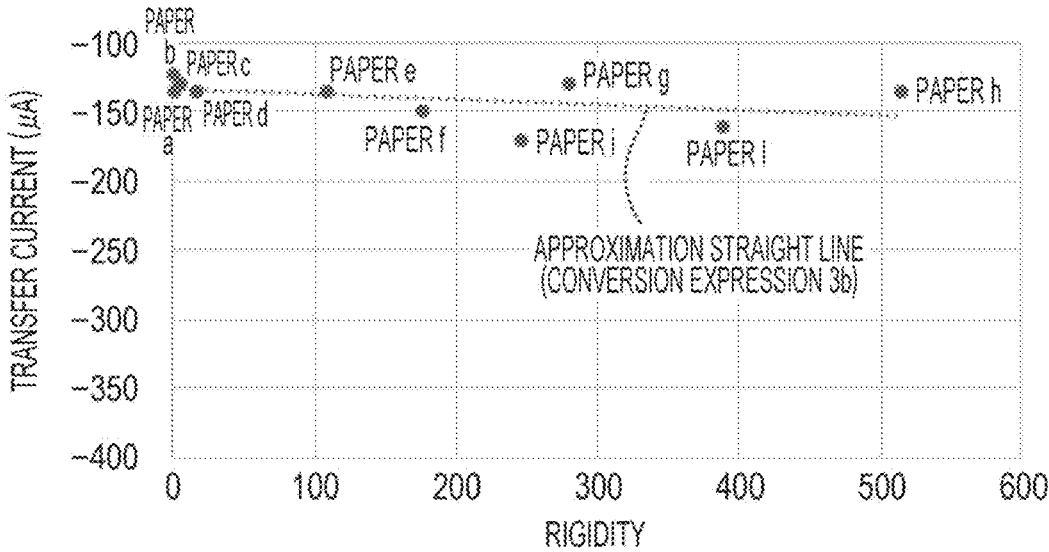
FIG. 13C is a graph indicating an example of correction information (conversion expression 3b) indicating a relationship between rigidity and a transfer current in a case of gross coated paper.

Next, correction processing of a process condition in a modification will be described with reference to FIGS. 12 to 13C. FIG. 12 is a subroutine flowchart illustrating the correction processing in step S28 in the modification FIGS.

13A to 13C are graphs indicating a relationship between each physical property information and corresponding process condition.

(Step S501)

In the step, the controller 81 performs processing similar to the processing in step S401 illustrated in FIG. 8. Specifically, the controller 81 acquires, from the accumulation section 82, the image quality information b2 and the process condition c2 described in the accumulated data of the neighboring physical property information a2.

(Step S502)

The condition setting section 813 calculates a correction amount of the process condition c2 using the difference data between the physical property information a0 and the physical property information a2 and the correction information (conversion expression 3b). FIGS. 13A to 13C indicates examples of the respective types of the correction information (conversion expression 3b) for calculating a process condition correction amount from the difference data of the physical property information used for the processing in step S502. For example, in a case where the difference between the physical property information a0 and the physical property information a2 corresponds to a difference relating to the absorptance, the condition setting section 813 uses the conversion expression 3b illustrated in FIG. 13A. With the conversion expression 3b indicated in FIG. 13A, a correction amount p1 of the transfer current It is calculated using the conversion expression 3b, which is a linear equation, according to the difference data of the absorptance as the physical property information. Similarly, in a case where the difference between the physical property information a0 and the physical property information a2 corresponds to a difference relating to the smoothness, the condition setting section 813 uses the conversion expression 3b illustrated in FIG. 13B, which is applied in a case where the determined paper type is mat coated paper. In a case where the difference between the physical property information a0 and the physical property information a2 corresponds to a difference relating to the rigidity, the condition setting section 813 uses the conversion expression 3b illustrated in FIG. 13C, which is applied in a case where the determined paper type is gross coated paper. These conversion expressions 3b are stored in advance in the accumulation section 82.

(Step S503)

The controller 81 determines whether or not the image quality information b2 in the accumulated data having the neighboring physical property information a2 acquired in step S501 is at a normal level. This processing is similar to the processing in the above-described step S23 or S403. The controller 81 proceeds the processing to step S504 in a case of abnormal, and proceeds the processing to step S505 in a case of normal.

(Step S504)

In the step, the condition setting section 813 performs processing similar to the processing in steps S25 and S404 to calculate a correction amount p2 based on the image quality level of the image quality information b2 acquired in step S501 and the correction information (correction expression 2).

(Step S505)

In the step, the condition setting section 813 determines that the correction related to the image quality information is unnecessary, and the correction amount p2 is set to 0.

(Step S506)

The condition setting section 813 adds the correction amounts p1 and p2 to the neighboring process condition c2 (the process condition relating to the transfer current) acquired in step S501 to set the acquired process condition cx4 as the output process condition. Then, the controller 81 ends the subroutine processing illustrated in FIG. 12, and returns to the processing illustrated in FIG. 7A.

As described above, in the present modification, the process condition is corrected using the correction information (conversion expression 3b) corresponding to each element of physical property information in which the difference occurs, and thus it is possible to obtain the similar effect as that of the first embodiment described above.

The above-described configurations of the image forming system and the control device have been described as a main configuration for describing the features of the above-described embodiment, and the present invention is not limited to the above-described configurations, and various modifications can be made within the scope of the claims. In addition, a configuration included in a typical image forming system or a control device is not excluded.

For example, the control device 80 may be integrated with the controller 21 of the system main body 10. In addition, the control device 80 may be arranged on a cloud server. Although the case where both the read image and the image quality information are included in the read information has been described, the present invention is not limited thereto. For example, instead of the read image, density data of a plurality of color patches for evaluation (arranged in the edge region) may be included, or the read image may not be included.

In addition, the means and method for performing various kinds of processing in the image forming system and the control device according to the above-described embodiment can be implemented by either a dedicated hardware circuit or a programmed computer. The program may be provided by, for example, a computer-readable recording medium such as a USB memory or a digital versatile disc (DVD)-ROM, or may be provided online via a network such as the Internet. In this case, the program recorded on the computer-readable recording medium is usually transferred to and stored in a storage such as a hard disk. Alternatively, the program may be provided as a single piece of application software or may be incorporated, as a function of an apparatus, into software of the apparatuses.

Although embodiments of the present invention have been described and illustrated in detail, the disclosed embodiments are made for purpose of illustration and example only and not limitation. The scope of the present invention should be interpreted by terms of the appended claims.

What is claimed is:

1. A control device capable of outputting a process condition under which an image forming section performs image forming on a recording sheet, the control device comprising:

a hardware processor that sets, based on physical property information corresponding to a physical property of a recording sheet and read information on an image evaluated as abnormal through reading of an image formed on the recording sheet by a reading section arranged on a recording sheet conveyance path downstream of the image forming section, a process condition under which the image forming section performs image forming on the recording sheet.

2. The control device according to claim 1, wherein the hardware processor sets the process condition based on read information including read information on an image determined as abnormal and read information on an image determined as normal, and the physical property information.

3. The control device according to claim 2, wherein
the image forming section performs image forming by an electrophotographic method,
the physical property information includes physical property information detected by a media sensor that detects a physical property of a recording sheet, and
the read information includes an evaluation result of normal and abnormal relating to image quality determined with a read image acquired by reading an image on the recording sheet on which the image forming section performs image forming.

4. The control device according to claim 3, wherein
the physical property information and the read information relating to the recording sheet are accumulated in an accumulation section as accumulated data in association with a process condition when performing image forming on the recording sheet, and
the hardware processor sets the process condition using the accumulated data.

5. The control device according to claim 4, wherein
the hardware processor sets, in a case where the evaluation result associated with the physical property information in the accumulated data that has been accumulated indicates that an image quality level is lower than a predetermined level, the process condition to make image quality be equal to or higher than the predetermined level or to make image quality achieve a highest level.

6. The control device according to claim 5, wherein
the hardware processor acquires, from an accumulation section, correction information with which the process condition is corrected according to the physical property information to set the process condition using the correction information.

7. The control device according to claim 5, wherein
the hardware processor newly generates correction information with which the process condition is corrected according to the physical property information and the image quality level to set the process condition using the correction information.

8. The control device according to claim 3, wherein
the evaluation result includes an evaluation result relating to a plurality of types of image quality.

9. The control device according to claim 8, wherein
the types of image quality include at least one of density abnormality, density unevenness, a white void, and image scattering.

10. The control device according to claim 3, wherein
the media sensor is arranged on the recording sheet conveyance path.

11. The control device according to claim 10, wherein
the hardware processor sets the process condition every time physical property information is acquired from the media sensor.

12. The control device according to claim 1, wherein
the process condition includes at least one of a transfer condition and a fixing condition.

13. The control device according to claim 12, wherein
the transfer condition includes at least one of a transfer current and a transfer voltage.

14. The control device according to claim 12, wherein
the fixing condition includes a fixing temperature.

15. A control device capable of controlling an image forming section that performs image forming on a recording sheet, the control device comprising:
a hardware processor that sets, based on read information corresponding to a read image acquired by reading an image formed on a recording sheet by a reading section arranged on a recording sheet conveyance path downstream of the image forming section and physical property information corresponding to a physical property of the recording sheet on which the image read by the reading section is formed, a process condition under which the image forming section performs image forming on the recording sheet.

16. The control device according to claim 1, wherein
the physical property information includes at least one of information of a moisture percentage, smoothness, and thickness of a recording sheet.

17. An image forming system comprising:
an image forming section that performs image forming by an electrophotographic method on a recording sheet conveyed through a recording sheet conveyance path;
a media sensor that detects a physical property of a recording sheet;
a reading section that is arranged on the recording sheet conveyance path and reads an image formed on the recording sheet on which the image forming section performs image forming to generate a read image;
an accumulation section that accumulates the physical property information corresponding to the physical property of the recording sheet and read information corresponding to the read image, in association with a process condition when performing image forming on the recording sheet, as accumulated data; and
the control device according to claim 1.

18. The control device according to claim 4, wherein
the accumulated data further includes paper type information, and
the physical property information, the paper type information, and the read information relating to a recording sheet are accumulated in the accumulation section as accumulated data in association with a process condition when performing image forming on the recording sheet.

19. The control device according to claim 15, wherein
the process condition includes at least one of a transfer condition and a fixing condition.

20. The control device according to claim 15, wherein
the physical property information and the read information relating to the recording sheet are accumulated in an accumulation section as accumulated data in association with a process condition when performing image forming on the recording sheet, and
the hardware processor sets the process condition using the accumulated data.

21. The control device according to claim 20, wherein
the read information includes an evaluation result of image quality determined with a read image acquired by reading an image on the recording sheet on which the image forming section performs image forming.

22. The control device according to claim 21, wherein
the evaluation result includes an evaluation result of image quality of abnormal and normal.

23. The control device according to claim 21, wherein
the evaluation result includes an evaluation result relating to a plurality of types of image quality.

24. The control device according to claim 23, wherein the types of image quality include at least one of density abnormality, density unevenness, a white void, and image scattering.

25. The control device according to claim 21, wherein the hardware processor sets, in a case where the evaluation result associated with the physical property information in the accumulated data that has been accumulated indicates that an image quality level is lower than a predetermined level, the process condition to make image quality be equal to or higher than the predetermined level or to make image quality achieve a highest level.

26. The control device according to claim 25, wherein the hardware processor newly generates correction information with which the process condition is corrected according to the physical property information and the image quality level to set the process condition using the correction information.

27. The control device according to claim 25, wherein the hardware processor acquires, from an accumulation section, correction information with which the process condition is corrected according to the physical property information to set the process condition using the correction information.

28. The control device according to claim 15, wherein the image forming section performs image forming by an electrophotographic method, and
the physical property information includes physical property information detected by a media sensor that detects a physical property of a recording sheet.

29. The control device according to claim 15, wherein the physical property information includes at least one of information of a moisture percentage, smoothness, and thickness of a recording sheet.

30. An image forming system comprising:
an image forming section that performs image forming by an electrophotographic method on a recording sheet conveyed through a recording sheet conveyance path;
a media sensor that detects a physical property of a recording sheet;
a reading section that is arranged on the recording sheet conveyance path and reads an image on the recording sheet on which the image forming section performs image forming to generate a read image;
an accumulation section that accumulates the physical property information corresponding to the physical property of the recording sheet and read information corresponding to the read image, in association with a process condition when performing image forming on the recording sheet, as accumulated data; and
the control device according to claim 15.

31. A non-transitory computer readable recording medium storing a control program that is executable by a control device capable of outputting a process condition under which an image forming section performs image forming on a recording sheet, the control program causing the control device to execute processing including:
a step (a) of acquiring physical property information corresponding to a physical property of a recording sheet and read information on an image evaluated as abnormal through reading of an image formed on the recording sheet by a reading section arranged on a recording sheet conveyance path downstream of the image forming section; and
a step (b) of setting, based on the physical property information and the read information, a process condition under which the image forming section performs image forming on the recording sheet.

32. A non-transitory computer readable recording medium storing a control program that is executable by a control device capable of outputting a process condition under which an image forming section performs image forming on a recording sheet, the control program causing the control device to execute processing including:
a step (a) of acquiring read information corresponding to a read image acquired by reading an image formed on a recording sheet by a reading section arranged on a recording sheet conveyance path downstream of the image forming section and physical property information corresponding to a physical property of the recording sheet on which the image read by the reading section is formed; and
a step (b) of setting, based on the read information and the physical property information, a process condition under which the image forming section performs image forming on the recording sheet.

* * * * *